United States Patent [19]

Shiraishi et al.

[11] Patent Number: 4,846,133
[45] Date of Patent: Jul. 11, 1989

[54] FUEL CONTROL APPARATUS

[75] Inventors: Hideo Shiraishi; Yoshinobu Kido; Kenji Ushijima, all of Shinchi; Setsuhiro Shimomura, Himeji; Hichirou Ohtani, Himeji; Shigeru Tamura, Himeji, all of Japan

[73] Assignee: Mitsubishi Denki Kabushiki Kaisha, Tokyo, Japan

[21] Appl. No.: 178,601

[22] Filed: Apr. 7, 1988

[30] Foreign Application Priority Data

Apr. 9, 1987 [JP] Japan ................................. 62-87278

[51] Int. Cl.$^4$ ............................................. F02D 41/18
[52] U.S. Cl. .................................... 123/494; 73/118.2
[58] Field of Search ................. 123/494; 73/118.2, 204

[56] References Cited

U.S. PATENT DOCUMENTS

| | | | |
|---|---|---|---|
| 4,357,829 | 11/1982 | Kraus et al. | 73/118.2 |
| 4,373,383 | 2/1983 | Plapp et al. | 73/118.2 |
| 4,596,138 | 6/1986 | Ito et al. | 73/204 |
| 4,756,185 | 7/1988 | Shimomura | 73/118.2 |

FOREIGN PATENT DOCUMENTS 54-76182  6/1979  Japan .

Primary Examiner—Andrew M. Dolinar
Attorney, Agent, or Firm—Oblon, Spivak, McClelland, Maier & Neustadt

[57] ABSTRACT

A fuel control apparatus comprises a fuel supplying means for supplying fuel to an internal combustion engine depending on the operation of a fuel control valve, a hot-wire type intake air quantity sensor disposed in an air-intake passage for the internal combustion engine to detect the quantity of air passing therethrough, a memory means which is adapted to accumulate an output from the intake air quantity sensor, the number of revolution of sand internal combustion engine, or the length of time in operation of the internal combustion engine, and holds the value obtained by the accumulation after the engine is stopped, and a control means for heating a hot wire at a temperature higher than a temperature in the normal operation so as to burn off a deposit on the hot wire after the accumulated value in the memory means reached a predetermined value and the engines is stopped.

3 Claims, 3 Drawing Sheets

FUEL CONTROL APPARATUS

FIELD OF THE INVENTION

1. Background of the Invention

The present invention relates to a fuel control apparatus for an internal combustion engine. More particularly, it relates to a fuel control apparatus for burning with a proper frequency and at a suitable temperature a deposit on the surface of a hot-wire type intake air quantity sensor used for controlling a fuel-supply to an internal combustion engine to thereby minimize deterioration in age of time characteristics due to contamination of the surface of the sensor.

2. Discussion of Background

The characteristics of hot-wire type intake air quantity sensors change depending on substances deposited on the surface of the sensors. Deposition of the substances causes an error in the quantity of fuel to be supplied to an engine, whereby there arise problems of deterioration of the exhaust gas and reduction in operational performance. To cope with the problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined Patent Publication No. 76182/1979.

Various kinds of substance are contained in air sucked into the internal combustion engine of a car during its operations. Such substance is generally classified into two groups, i.e. organic materials such as hydrocarbon derived from exhaust gas from the engine and inorganic materials such as fine particles of soil and sand. They easily deposit on the surface of the hotwire type intake air sensor.

The organic materials can be burnt at a temperature of several hundreds centigrade. However, it is impossible to burn the inorganic materials. Particularly, when silicon oxide and aluminum oxide as the main components of soil and sand are heated at a high temperature, there takes place a binding phenomenon and on the contrary, they strongly adhere on the hot wire. Accordingly, the quantity of the deposite gradually increases by repeating the operations of the engine and the burning-off. Finally, the characteristics of the sensor is lost.

SUMMARY OF THE INVENTION

It is an object of the present invention to provide a fuel control apparatus capable of reducing deterioration of the characteristics of an intake air quantity sensor to a neglisible extent even though air containing organic and inorganic materials is taken and capable of being easily manufactured with a lower cost.

The foregoing and the other objects of the present invention have been attained by providing a fuel control apparatus which comprises a fuel supplying means for supplying fuel to an internal combustion engine depending on the operation of a fuel control valve, a hot-wire type intake air quantity sensor disposed in an air-intake passage for the internal combustion engine to detect the quantity of air passing therethrough, a memory means which is adapted to accumulate an output from the intake air quantity sensor, the number of revolution of said internal combustion engine, or the length of running time in operation of the internal combustion engine, and holds the value obtained by the accumulation after the engine is stopped, and a control means for heating a hot wire at a temperature higher than a temperature in the normal operation so as to burn off a deposit on the hot wire after the accumulated value in the memory means reaches a predetermined value and the engine is stopped.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the fuel control apparatus of the present invention will be described with reference to drawings.

Figure 1:
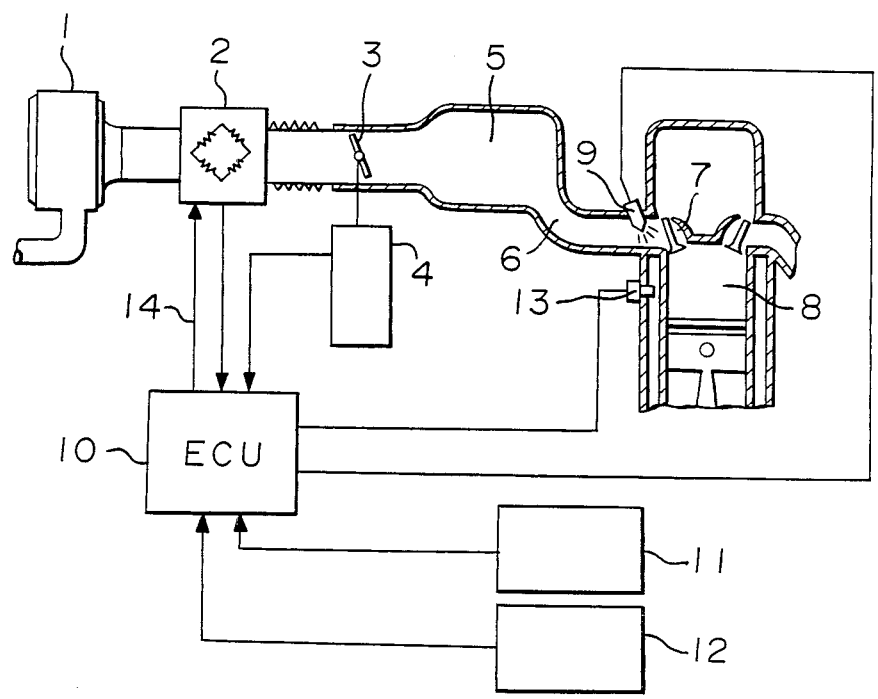
FIG. 1 is a diagram showing an embodiment of the fuel control apparatus according to the present invention.

FIG. 1 is a diagram showing the construction of a fuel controlling apparatus using a hot-wire type intake air quantity sensor 2 (hereinbelow, referred to as an AFS) for detecting the quantity of air sucked into an internal combustion engine. In FIG. 1, a reference numeral 1 desigantes an air cleaner; a numeral 3 designates a throttle valve for controlling the quantity of air sucked into the engine and a numeral 4 designates a throttle sensor being operable in association with the throttle valve 3 and generating a voltage signal depending on the movement of the throttle valve 3. The voltage signal of the throttle sensor 4 is applied to an electronic control unit 10 (hereinbelow, referred to as an ECU). A surge tank 5 is communicated with an intake manifold 6 which is, in turn, connected to a cylinder 8. An inlet valve 7 driven by a cam (not shown) is provided in the cylinder 8.

A fuel control valve 9 (hereinbelow, referred to as an injecter) is provided for each of the cylinders 8. In FIG. 1, only one cylinder 8 is shown for simplification of the drawings although a plurality of the cylinders are in fact provided in the engine.

The ECU 10 controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS 2, a crank angle sensor 11, a starting switch 12, a temperature sensor 13 for detecting the temperature of cooling water for the engine and a throttle sensor 4, and controls a pulse width for feeding the fuel so that the fuel is intermittently injected from the injector 9 in synchronism with the signal of the crank angle sensor 11 at constant intervals., The ECU 10 generates a burning-off control signal 14 when conditions for the burning-off are all satisfied. The construction and function related to the control of burning-off the AFS are well known, therefore description is omitted.

Figure 2:
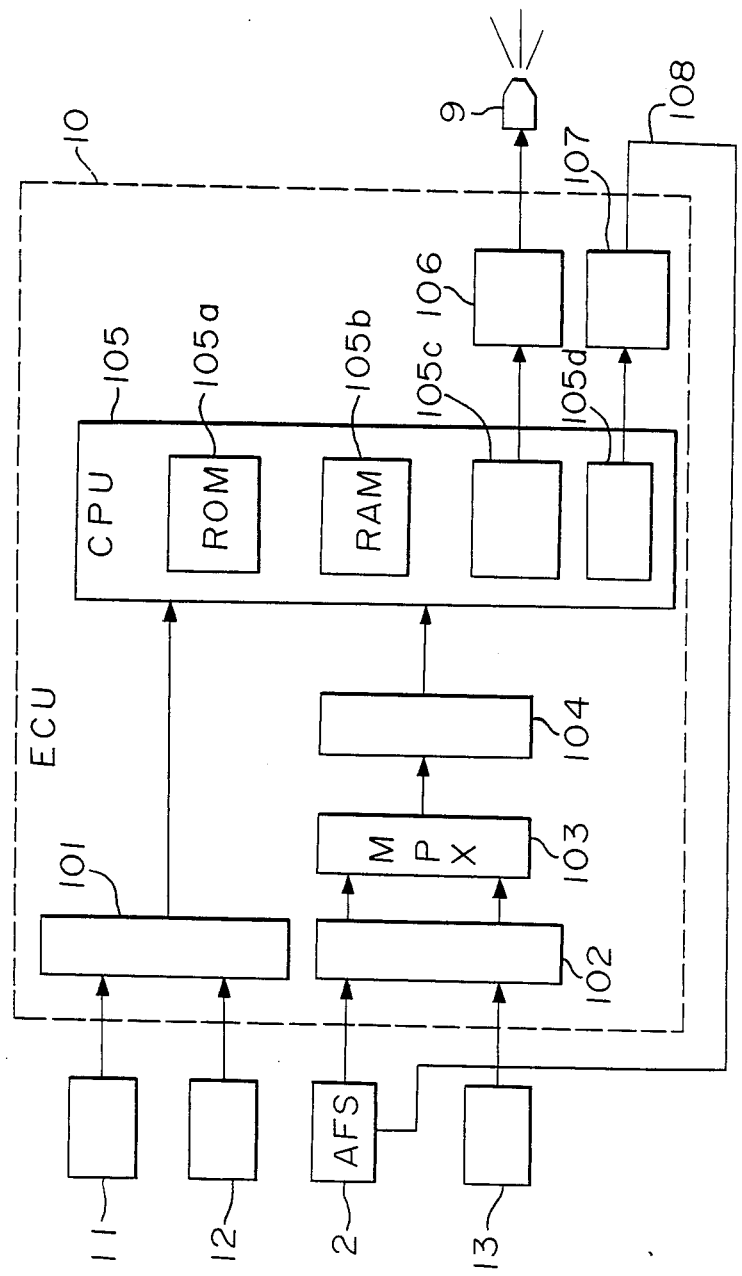
FIG. 2 is a block diagram showing an embodiment of the electronic control unit used for the fuel control apparatus shown in FIG. 1.

FIG. 2 is a block diagram showing an internal structure of the ECU 10. In FIG. 2, a reference numeral 101 designates an interface circuit for inputting digital values from the crank angle sensor 11 and the starting switch 12.

An analogue interface circuit 102 receives each signal from the AFS 2 and the water temperature sensor 13 and outputs an output signal to a multiplexer 103. An analogue signal from the multiplexer 103 is fed to an analogue-digital (A/D) transducer 104 in which the analogue signal is converted into a digital signal.

A central processing unit 105 (hereinbelow, referred to as a CPU) includes an ROM 105a, an RAM 105b and timers 105c and 105d. The CPU calculates the pulse width for actuating the injector according to a program stored in the ROM 105a on the basis of the signals from the interface circuit 101 and the A/D transducer 104, and outputs a pulse having a predetermined time width through the timer 105c. A driving circuit 106 amplifies the pulse signal from the timer 105c to drive the injector 9. A system for controlling the quantity of the fuel is known, and therefore description is omitted.

Figure 3:
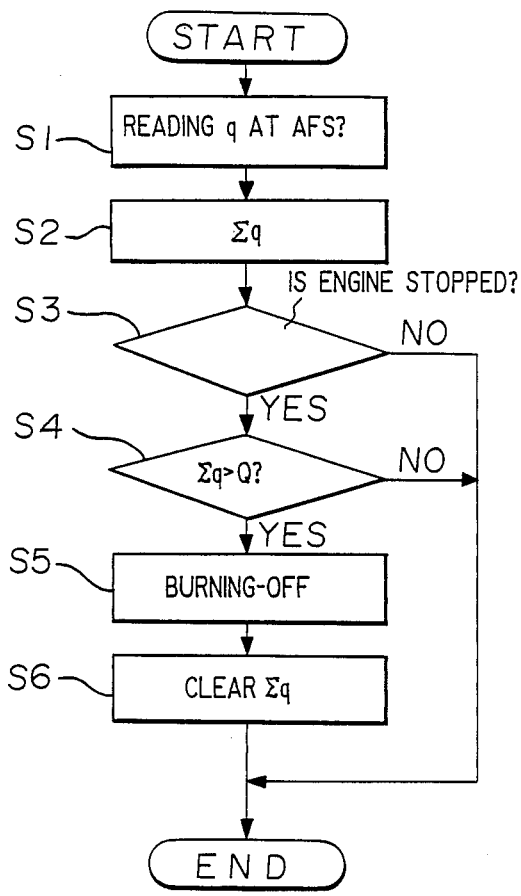
FIG. 3 is a flow chart showing an example of a program for the fuel control apparatus of the present invention.

The timer 105d is adapted to produce a burning-off pulse signal according to a programmed operation as shown in FIG. 3. The pulse signal is amplified in the driving circuit 107 to be supplied as a burning-off signal 18 to the AFS 2. A program concerning the burning-off of the hot wire of the intake air quantity sensor used for the fuel control apparatus shown in FIGS. 1 and 2 will be described with reference to a flow chart in FIG. 3.

The flow chart shows only the sequential operations of the EPU 10 from the stop of the engine to the burning-off operation, and the sequential operations for controlling the fuel during the operation of the engine is omitted.

First of all, outputs q from the AFS 2 are successively read at Step S1 and the output values are accumulated at Step S2.

The accumulated value is stored in the RAM 105b in FIG. 2. A power source is always connected to the RAM 105b even when the engine is stopped so that the accumulated value is always maintained.

It is possible that the accumulated value is maintained by another memory means such as a non-volatile memory.

Then, judgement is made as to whether the engine is in operation or is stopped at Step S3. If the engine is in operation, the controlling operation goes to the end. If the engine is stopped, judgement is made as to whether the accumulated value Σq is greater than a predetermined value Q or is smaller than it. If the accumulated value Σq is smaller than the predetermined value Q, the controlling operation goes to the end.

When the accumulated value Σq is greater than Q, the burning-off operation is carried out at Step S5. The detail of carrying-out of the burning-off operation is omitted because it is known.

Then, the accumulated value Σq is cleared at Step S6 to finish the controlling operation.

The predetermined value Q is so determined that the frequency of the burning-off operations can be reduced as possible within an allowable range of deterioration in the characteristics of the AFS, such deterioration being caused by accumulation of the organic deposit on the surface of the hot wire as a result of continuous operation of the AFS2. In the determination of the predetermined value Q to be large as possible, the temperature of the normal operation for the hot wire is a very important factor. Namely, when the operational temperature is elevated to the extent that the organic materials evaporate, the accumulation of deposit is greatly reduced. Accordingly, it is possible to give a large value Q.

On the other hand, if the operational temperature is too high, there causes undesirable deposition of inorganic materials during the normal operations. It is revealed in experiments that the optimum condition can be provided by determining operational temperature in the range of 150° C.–300° C. In this case, the predetermined value Q can be selected to be sufficiently large, and the frequency of the burning-off operations can be reduced to one tenth as small as that in the conventional fuel control apparatus.

The heating temperature in the burning-off operations should be so determined that the organic materials can be sufficiently burnt and solidification and melt-bonding of the organic materials can not be formed. It is revealed from experiments that the temperature should be in a range of 500° C.–1200° C.

In the embodiment shown in FIG. 3, the value of the quantity of intake air q is accumulated in the continuous operation of the AFS2. However, the number of revolution of the engine or the length of time in the running operation of the engine may be accumulated. Further, when the fuel control apparatus is used for an automobile, the distance (which is equivalent to the accumulation of the number of revolution of the engine) may be accumulated to obtain the same control as the above-mentioned embodiment.

Thus, the number of burning-off operations can be reduced by providing an appropriate operational temperature for the hot wire of the intake air quantity sensor so that the change in characteristics of the sensor due to the deposition of organic materials is minimized.

The heating temperature in the burning-off operations is effective to burn the organic materials and avoids the solidification of the inorganic materials.

Thus, in the fuel control apparatus of the present invention, the value of the output of the intake air quantity sensor, the number of revolution of the internal combustion engine or the length of time in running operation of the engine is accumulated, the accumulated value being maintained and the burning-off operation is carried out by heating the hot wire of the intake air quantity sensor when the accumulated value reaches a predetermined value and the internal combustion engine is stopped. Accordingly, the deterioration in characteristics of the intake air quantity sensor can be minimized to the negligible extent even though air including inorganic materials and organic materials is taken in the engine, and therefore performance of the sensor is remarkably improved.

In the present invention, the above-mentioned effect can be obtained by only changing a set value in a temperature controlling unit of the intake air quantity sensor and by slightly modifying a control program. Accordingly, the fuel control apparatus of the present invention can be easily realized from the economical and technological viewpoint.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel control apparatus which comprises a fuel supplying means for supplying fuel to an internal combustion engine depending on the operation of a fuel control valve, a hot-wire type intake air quantity sensor disposed in an air-intake passage for said internal combustion engine to detect the quantity of air passing therethrough, a control means for heating a hot wire at a temperature higher than a temperature in the normal operation so as to burn off a deposit on said hot wire means for actuating said control means at regular intervals, including a memory means which is adapted to accumulate a value from an output of said intake air quantity sensor, the number of revolutions of said internal combustion engine or the length of time in operation of said internal combustion engine, said value being accumulated as a measurement of the interval since the previous burnoff operation, means for comparing said value with a predetermined value representing the desired interval between burnoff operations and for actuating the control means if the accumulated value is greater than the predetermined value, and means to reset said memory means after said control means is actuated.

2. The fuel control apparatus according to claim 1, wherein said hot wire of the intake air quantity sensor is heated at a temperature of 150° C.–300° C. during the operation of said internal combustion engine, and it is heated at a temperature of 500° C.–1200° C. when burning of said deposit is carried out.

3. The fuel control apparatus according to claim 1, wherein judgement as to whether or not said accumulated value reaches said predetermined value is made after said internal combustion engine is stopped.

* * * * *